US010837997B2

(12) United States Patent
Ando et al.

(10) Patent No.: US 10,837,997 B2
(45) Date of Patent: Nov. 17, 2020

(54) FAILURE PREDICTION DEVICE AND CIRCUIT BOARD USING THE SAME

(71) Applicant: Mitsubishi Electric Corporation, Tokyo (JP)

(72) Inventors: Nobuaki Ando, Tokyo (JP); Hiroo Sakamoto, Tokyo (JP); Daisuke Echizenya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/346,164

(22) PCT Filed: Oct. 20, 2017

(86) PCT No.: PCT/JP2017/037965
§ 371 (c)(1),
(2) Date: Apr. 30, 2019

(87) PCT Pub. No.: WO2018/116611
PCT Pub. Date: Jun. 28, 2018

(65) Prior Publication Data
US 2020/0049758 A1 Feb. 13, 2020

(30) Foreign Application Priority Data
Dec. 20, 2016 (JP) ................................ 2016-246616

(51) Int. Cl.
*G01R 31/28* (2006.01)
*G06F 30/39* (2020.01)
*H05K 1/02* (2006.01)

(52) U.S. Cl.
CPC ..... *G01R 31/2817* (2013.01); *G01R 31/2818* (2013.01); *G06F 30/39* (2020.01); *H05K 1/0268* (2013.01)

(58) Field of Classification Search
CPC .... G06F 30/39; G01R 31/2818; H05K 1/0268
See application file for complete search history.

(56) References Cited

U.S. PATENT DOCUMENTS

2007/0017699 A1* 1/2007 Ishimoto ................ H05K 3/306
174/260
2008/0231286 A1* 9/2008 Tsunekazu ............. G01R 31/50
324/509
2009/0146674 A1* 6/2009 Tanabe ............... G01R 31/2808
324/750.01

FOREIGN PATENT DOCUMENTS

JP  2000-214160 A  8/2000
JP  2010-205821 A  9/2010
(Continued)

OTHER PUBLICATIONS

International Search Report of the International Searching Authority dated Jan. 9, 2018 for the corresponding international application No. PCT/JP2017/037965 (and English translation).

*Primary Examiner* — Alvaro E Fortich
(74) *Attorney, Agent, or Firm* — Posz Law Group, PLC

(57) ABSTRACT

A failure prediction device is provided for predicting, using a structure having a high degree of design freedom, failure at a soldered joint due to vibration stress, and a circuit board using the same. The failure prediction device is disposed on a substrate having a mounting component that is fixed thereon through a solder joint. The failure prediction device is provided with a load amplifying portion that includes a pair of support leg portions each having one end to be fixed to the substrate or the mounting component, and a sacrificial fracture portion that is supported by the other ends of the pair of support leg portions, wherein the load amplifying portion transmits, to the sacrificial fracture portion via the pair of support leg portions, vibration that is applied to the substrate.

19 Claims, 11 Drawing Sheets

(56) References Cited

FOREIGN PATENT DOCUMENTS

| | | |
|---|---|---|
| JP | 2013-130519 A | 7/2013 |
| JP | 2015-090332 A | 5/2015 |
| JP | 2016-100361 A | 5/2016 |
| WO | 2011/036751 A1 | 3/2011 |
| WO | 2011/036776 A1 | 3/2011 |

* cited by examiner

FAILURE PREDICTION DEVICE AND CIRCUIT BOARD USING THE SAME

CROSS REFERENCE TO RELATED APPLICATIONS

This application is a U.S. national stage application of International Application No. PCT/JP2017/037965, filed on Oct. 20, 2017, and is based on Japanese Patent Application No. 2016-246616, filed on Dec. 20, 2016, the contents of which are incorporated herein by reference.

TECHNICAL FIELD

The present invention relates to a failure prediction device having a failure prediction structure, and a circuit board using the same.

BACKGROUND

A large number of mounting components are connected by soldering to a circuit board installed in an electric appliance. Such mounting components are often exposed to stress due to external force caused by heat and vibration, etc. from outside. Such stress due to the external force sometimes creates cracks at solder joint portions (the portions at which the mounting components are soldered to the board) and causes the cracks to extend, which may lead disconnection to occur. Disconnection occurring at the solder joint portions is a cause of unexpected stoppage or failure of electric appliances. If such disconnection occurring at the solder joint portions can be predicted at a stage before it happens, timing at inspection of electric appliances and replacement of their components can be specified, so that electric appliances can be operated efficiently. Therefore, a technology to predict failure occurring at the solder joint portions is essential.

For example, Patent Document 1 discloses a structure in which a circuit board and a long and narrow package in an arch shape are soldered (a sacrificial fracture portion). In the structure, by forming a sacrificial fracture portion at a high strain region where strain is concentrated when thermal stress occurs, the sacrificial fracture portion is fractured earlier than the solder joint portions between the circuit board and the mounting components, and then the failure at the solder joint portions is predicted on the basis of the change in an electrical characteristic caused by the fracture in the sacrificial fracture portion.

Further, Patent Document 2 discloses a structure in which among the solder joint portions of a package of a ball grid array (BGA) type or a quad flat package (QFP) type mounted on a circuit board, at least one dummy joint portion is provided at an outer peripheral edge of a package where stress is concentrated. An electrical characteristic of the dummy joint portion is measured when acceleration equal to or above a certain value is applied from a vibration source. Then, the damage level of the solder joint portions is predicted on the basis of the measured electrical characteristic.

Furthermore, Patent Document 3 discloses that a first wire and a second wire each having a low strength structure are provided at four corner regions where stress is concentrated most in a BGA type package mounted on a circuit board. With such a configuration, the low strength structures in the first wire and the second wire are fractured earlier than solder joint portions. Then, failure of the solder joint portions in the package is predicted from the change in the electrical characteristics of the first and the second wires.

Regarding Patent Document 1 (Japanese Patent Laid-Open Publication No. 2016-100361), failure under thermal stress can be predicted because difference in the thermal expansion coefficient between component materials is utilized. However, prediction of failure under vibration stress is not considered, and thus a problem arises in that the vibration stress cannot be handled. Regarding Patent Document 2 (International Publication No. WO2011/036751), it is necessary to dispose a dummy joint portion at an outer peripheral edge of a package where vibration stress is concentrated. Further, regarding Patent Document 3 (International Publication No. WO2011/036776), it is necessary to dispose one end of the wire at the outer peripheral edge of the package where stress is concentrated, and thus a problem arises that the installation location is limited.

SUMMARY

The present invention has been made in consideration of the above described problem. An object thereof is to provide a failure prediction device having a structure with a high degree of design freedom for predicting failure of a solder joint portion caused by vibration stress, as well as to provide a circuit board having such a failure prediction device.

A failure prediction device according to the present invention is disposed on a substrate having a mounting component that is fixed thereon through a solder joint. The failure prediction device is provided with a load amplifying portion that includes a pair of support leg portions each having one end to be fixed to the substrate or the mounting component, and a sacrificial fracture portion that is supported by the other ends of the pair of support leg portions, wherein the load amplifying portion transmits, to the sacrificial fracture portion via the pair of support leg portions, vibration that is applied to the substrate.

The failure prediction device according to the present invention and the circuit board using the same make it possible to predict failure of the solder joint portions, in a case where the circuit board is under vibration stress and thermal stress, by designing the lifetime of the sacrificial fracture portion to be shorter than the lifetime of the solder joint portions with a high degree of design freedom, using embodiments each to be described later.

DETAILED DESCRIPTION

Embodiment 1

Figure 1:
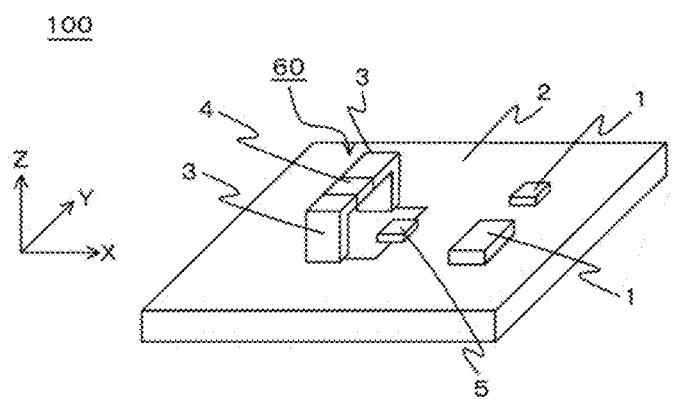
FIG. 1 is a perspective view showing a circuit board according to Embodiment 1.
Figure 2:
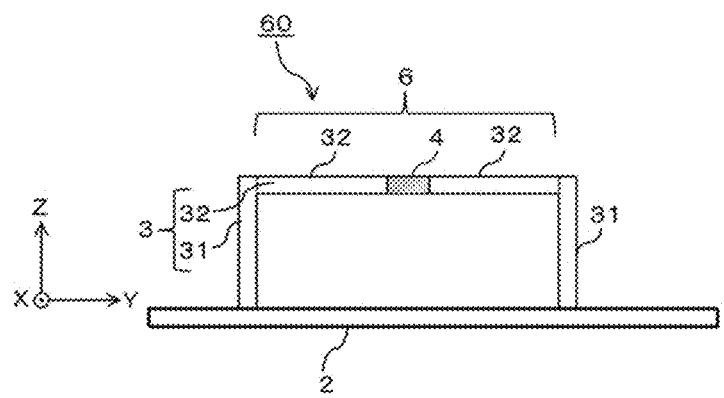
FIG. 2 is a side view showing a load amplifying portion of the circuit board according to Embodiment 1.

FIG. 1 is a perspective view showing a circuit board 100 according to Embodiment 1. FIG. 2 is a side view of FIG. 1. A circuit board 100 includes a substrate 2 having a mounting component 1 soldered thereon, a load amplifying portion 60 disposed in the substrate 2 or the mounting component 1 to amplify load applied to the substrate 2, a measurement section 5 to measure an electrical characteristic of the load amplifying portion 60, and a failure prediction unit (not illustrated) to predict failure caused by fracture of solder joint portions on the basis of the measurement result from the measurement section 5. Note that, a failure prediction device includes the measurement section 5, the load amplifying portion 60, and the failure prediction unit.

Directions to be defined in the present embodiment will be defined. As shown in FIG. 1, X direction, Y direction, and Z direction that are orthogonal to each other are respectively defined as a depth direction, a lateral direction, and a height direction (out-of-plane direction). Note that, although a coordinate system as mentioned above is set for the convenience of description, X direction, Y direction, and Z direction may be set in accordance with the disposition of the load amplifying portion 60.

The mounting component 1 may be a package referred to as a BGA type or a QFP type, or an electronic component such as a capacitor and a chip resistor as long as it is an electronic component that can be mounted on the substrate 2.

The load amplifying portion 60 shown in FIG. 1 and FIG. 2 includes a pair of support leg portions 3 each made of an electric conductor in L shape and a sacrificial fracture portion 4 (a first sacrificial fracture portion) supported by the pair of support leg portions 3. In the figures, the sacrificial fracture portion 4 is disposed apart from the substrate 2 and the mounting component 1 in the out-of-plane direction of the substrate 2 (Z direction). Note that the sacrificial fracture portion 4 in the present embodiment and sacrificial fracture portions 4A through 4F to be described in Embodiment 2 and thereafter correspond to first sacrificial fracture portions. One ends, as first ends, of the support leg portions 3 are fixed to the substrate 2. The other ends, as second ends, of the support leg portions 3 are fixed to ends of the sacrificial fracture portion 4. In other words, the load amplifying portion 60 includes the pair of support leg portions 3 each having one end (first end) fixed to the substrate 2 or the mounting component 1, and the sacrificial fracture portion 4 that is supported by each of the other ends (second ends) of the support leg portions 3. The sacrificial fracture portion 4 has to be designed so that its lifetime will be shorter than that of the solder joint portions on the substrate 2. A specific example of the design method will be described later.

Each of the support leg portions 3 includes a leg 31 and a bridge connection portion 32. In FIG. 2, each of the legs 31 is a portion outside the dotted lines in the Y direction. Each of the bridge connection portions 32 is a portion inside the dotted lines in the Y direction. The bridge portion 6 is structured by connecting each of the bridge connection portions 32 to each of the both ends of the sacrificial fracture portion 4. Note that the shape of the support leg portions 3 is not limited to the L shape, and it may be a curved shape between one end and the other end. Any shape may be used as long as the structure is formed in such a way that the sacrificial fracture portion 4 is supported by being sandwiched at the both ends thereof.

The legs 31 and the substrate 2 are mechanically fixed to each other with a screw, a bolt, or the like. In this way, the fixation between the load amplifying portion 60 and the substrate 2 is not released before the sacrificial fracture portion 4 is fractured. As long as the fixation between the load amplifying portion 60 and the substrate 2 is not released before the sacrificial fracture portion 4 is fractured, besides mechanical fixation, it goes without saying that it may be done via an adhesive or a solder joint may be made.

Here, a variation in the shape of the load amplifying portion 60 will be exemplified. The cross-sectional shape of the inner peripheral face of the load amplifying portion 60 shown in the present embodiment is semi-rectangular in the Y-Z cross-section. However, the shape may be a part of a circle or an ellipse. Further, the cross-sectional shape of the inner peripheral face of the load amplifying portion 60 may take whatever shape as long as the load is amplified at the load amplifying portion 60.

A variation of material structure of the load amplifying portion 60 will be exemplified. In the present embodiment, an example will be described in which the support leg portions 3 and the sacrificial fracture portion 4 are formed of different materials. However, the support leg portions 3 and the sacrificial fracture portion 4 may be formed of the same material as long as a structure is adopted in which a part of the load amplifying portion 60 is fractured earlier than the solder joint portions by the load applied to the substrate 2.

The support leg portions 3 and the sacrificial fracture portion 4 are respectively formed of a copper and a solder (for example, a lead-free solder: Sn-3Ag-0.5Cu). The support leg portions 3 and the sacrificial fracture portion 4, as long as they are formed of conductive materials, may be formed of materials different from those mentioned above, such as a solder material, an Ag paste, a conductive resin, or a non-conductive material having a metallized layer thereon so as to be conductive.

Figure 3:
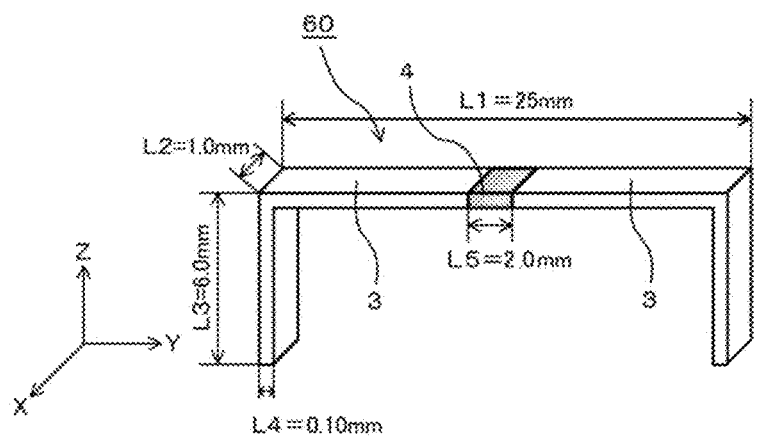
FIG. 3 is a perspective view showing an example of the dimensions of the load amplifying portion of the circuit board according to Embodiment 1.

Here, an example of the shape of the load amplifying portion 60 to be used in an inverter and a servo motor will be described with reference to FIG. 3. FIG. 3 is a perspective view showing an example of the dimensions of the load amplifying portion 60 according to Embodiment 1. As shown in the figure, in the load amplifying portion 60, the width L1, the depth L2, the height L3, and the width L4 are respectively 25 millimeters (hereinafter, mm), 1.0 mm, 6.0 mm, and 0.10 mm. The width L5 of the sacrificial fracture portion 4 is 2.0 mm.

In a case where the support leg portions 3 and the sacrificial fracture portion 4 are formed of different materials and a lower strength material in fracture strength is used for the sacrificial fracture portion 4 than a material used for the support leg portions 3, the sacrificial fracture portion 4 is fractured more easily, so that the shape of the load amplifying portion 60 can be more freely designed. Thus, under thermal stress or vibration stress applied to the substrate 2, the sacrificial fracture portion 4 can be fractured at an earlier stage than that in the solder joint portions with higher reliability.

The electrical characteristic of the sacrificial fracture portion 4, such as a DC resistance value, changes owing to crack extension and fracture. Through the measurement in the measurement section 5 for the electrical characteristic at the sacrificial fracture portion 4 or at the load amplifying portion 60 including the support leg portions 3 and the sacrificial fracture portion 4, the failure of the solder joint portions is predicted using a method to be described below. Note that the electrical characteristic to be measured may be an impedance, or the like, instead of a DC resistance. In a case of a capacitor, a coil, or the like, capacitance or inductance may be measured.

Vibration stress, thermal stress, etc. are repeatedly applied to the substrate 2 that is mounted on electronic devices, particularly such as a servo motor or an inverter. These stresses are caused by the operating conditions of the device on which the substrate 2 is mounted as well as the usage environment (ambient temperature, humidity, vibration state, etc.).

Effects of vibration stress and thermal stress on the substrate 2 and the electronic components mounted on the substrate 2 will be described below.

Figure 4:
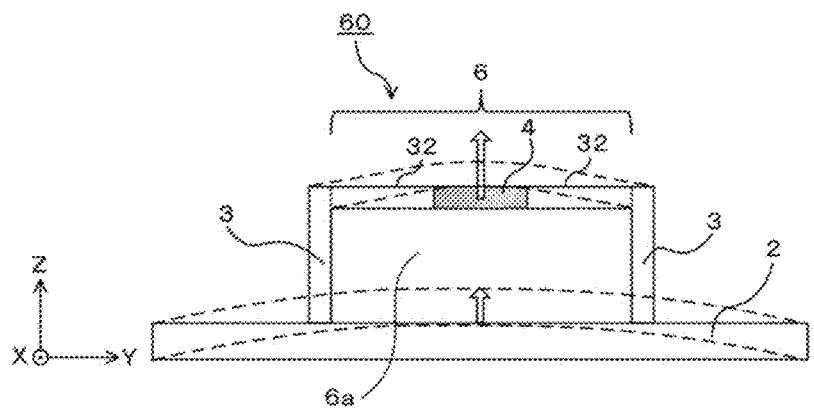
FIG. 4 is a schematic diagram showing deformation of the load amplifying portion of the circuit board according to Embodiment 1 under vibration stress.

First, referring to FIG. 4, an effect of vibration stress on the substrate 2 or the like will be described. FIG. 4 is a schematic diagram of the deformation of the load amplifying portion 60 including the support leg portions 3 and the sacrificial fracture portion 4 when vibration stress is applied to the substrate 2. Owing to the deformation in the out-of-plane direction (Z direction), tensile stress is applied to one face of the sacrificial fracture portion 4 with respect to the out-of-plane direction (Z direction) and compressive stress is applied to the other face thereof. While the substrate 2 is under vibration stress, the stress is repeatedly applied to the sacrificial fracture portion 4, and then, a crack is generated and extends in the sacrificial fracture portion 4, and eventually fracture occurs.

Here, the deformation of the load amplifying portion 60 under vibration stress will be described. When the substrate 2 is under vibration stress, the load amplifying portion 60 deforms in the out-of-plane direction (Z direction) with respect to the substrate 2. The space 6a provided under the sacrificial fracture portion 4 allows the sacrificial fracture portion 4 to deform in the out-of-plane direction (Z direction) without being restrained by the substrate 2. Thus, the vibration of the substrate 2 is amplified as described later, at the load amplifying portion 60, and vibration stress repeatedly applied to the sacrificial fracture portion 4 leads to its fracture.

The amplification of vibration stress at the load amplifying portion 60 will be described below. Since he load amplifying portion 60 according to the present embodiment has a structure in which the sacrificial fracture portion 4 is supported by a pair of the support leg portions 3, the vibration transmitted to each of the legs 31 of a pair of the support leg portions 3 is transmitted to the sacrificial fracture portion 4 via the bridge connection portions 32 each connected to the corresponding one of a pair of the legs 31. Because the vibration is transmitted from each of the pair of legs 31 toward the center of the load amplifying portion 60, the vibration is intensified, for example, at the center of the load amplifying portion 60, and thus, the deformation thereat (stress) in the out-of-plane direction (Z direction) becomes larger than that on the substrate 2. In the present embodiment, the sacrificial fracture portion 4 is disposed at a position where the deformation (stress) in the out-of-plane direction (Z direction) is larger, and thus the lifetime can be designed in such a way that the sacrificial fracture portion 4 is fractured earlier than the solder joint portions on the substrate 2. Note that the position at which the sacrificial fracture portion 4 is disposed is not limited to the center of the load amplifying portion 60, but may be any position in the load amplifying portion 60 as long as the vibration is intensified. The position at which the vibration is intensified varies depending on the characteristic (frequency, phase) of the vibration occurring in the substrate 2 and the physical properties of the load amplifying portion 60. Therefore, it is natural that the position of the sacrificial fracture portion 4 may be appropriately determined in accordance with the shape and the physical properties of the load amplifying portion 60.

In the present embodiment, the structure is such that a solder joint portion as a sacrificial fracture portion is not disposed between the load amplifying portion 60 and the substrate 2, but the sacrificial fracture portion 4 is provided in the load amplifying portion 60. Therefore, the sacrificial fracture portion 4 is not disposed at a solder joint portion where the vibration in the substrate 2 is directly transmitted without amplification, but is disposed at the position where the deformation caused by vibration stress is larger, so that the failure of the solder joint portions between the mounting component 1 and the substrate 2 under vibration stress can be predicted with a high degree of design freedom.

In addition, the load amplifying portion 60 according to the present embodiment has a structure in which the space 6a is provided under the sacrificial fracture portion 4. Therefore, the load amplifying portion 60 according to the present embodiment, being different from a structure in which the sacrificial fracture portion 4 is disposed on the substrate 2 without the space 6a provided, has a structure in which there is nothing that hinders the deformation of the sacrificial fracture portion 4 in the out-of-plane direction (Z direction). Thus, the sacrificial fracture portion 4 can be reliably fractured earlier than the solder joint portions.

Figure 5:
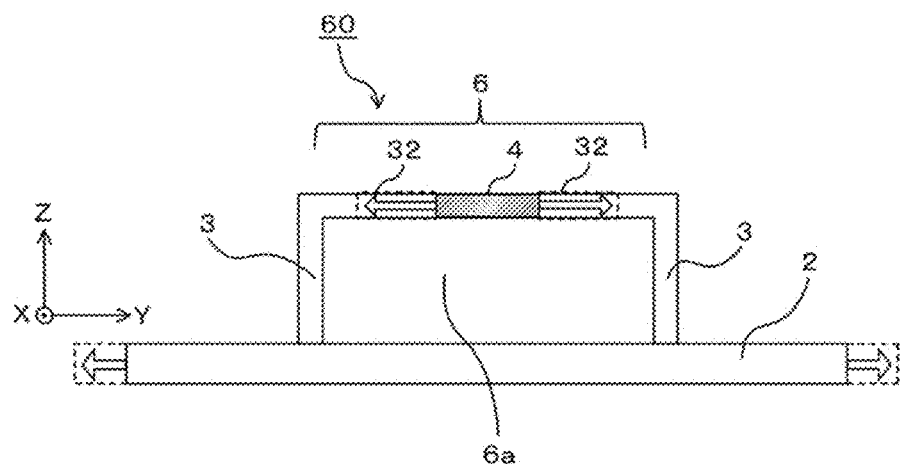
FIG. 5 is a schematic diagram showing deformation of the load amplifying portion of the circuit board according to Embodiment 1 when temperature of the circuit board rises.

Next, referring to FIG. 5, an effect of thermal stress on the substrate 2 or the like will be described. FIG. 5 is a schematic diagram showing the deformation of the load amplifying portion 60 formed with the support leg portions 3 and the sacrificial fracture portion 4 when thermal stress is applied to the substrate 2. When thermal stress is applied to the substrate 2 and then the temperature of the substrate 2 rises, the substrate 2 thermally deforms in the direction indicated by arrows in FIG. 5, that is, in the in-plane direction (Y direction). Owing to the tensile stress caused by the thermal deformation of the substrate 2, the support leg portions 3 and the sacrificial fracture portion 4 deform so as to be elongated in the in-plane direction (Y direction) of the substrate 2. In contrast, when the temperature of the substrate 2 falls, owing to the compressive stress, the deformation occurs in the reverse direction of the arrows shown in FIG. 5. When such thermal stress is repeatedly applied, tensile stress and compressive stress are uniformly applied again and again to the sacrificial fracture portion 4 in the in-plane direction (in the Y direction), so that a crack is generated and extends in the sacrificial fracture portion 4 and the sacrificial fracture portion 4 is eventually fractured.

Assuming that the structural materials are such that apparent coefficients of linear expansion regarding the load amplifying portion 60 formed with the support leg portions 3 and the sacrificial fracture portion 4 and regarding the circuit board each take a different value, the load amplifying portion 60 under thermal stress deforms larger compared with the deformation caused by the free expansion. Thus, also in terms of the thermal stress, a load amplifying portion 60 including a sacrificial fracture portion whose lifetime is shorter than the solder joint portions can be structured. Note that the apparent coefficient of linear expansion means the coefficient of linear expansion when the support leg portions 3 and the sacrificial fracture portion 4 are assumed to be an integrated component. In addition, by appropriately setting a difference between the apparent coefficient of linear expansion of the load amplifying portion 60 and the coefficient of linear expansion of the mounting component 1 or the substrate 2 on which the load amplifying portion 60 is to be mounted, the failure of the solder joint portions can be predicted more effectively. For example, when a flame retardant type 4 (FR-4) substrate, whose coefficient of linear expansion is 14 to 16 (ppm/K), is used as the substrate 2, the load amplifying portion 60 needs to be formed of materials whose apparent coefficient of linear expansion is 19 to 21 (ppm/K).

In order to predict failure of a solder joint portion, it is necessary to design the structure such that the lifetime of the sacrificial fracture portion 4 when the substrate 2 is under thermal or vibration stress is shorter than that of the solder joint portion. From such a standpoint, an example of a method of designing the lifetime of the solder joint portion and the sacrificial fracture portion 4 will be described.

First, the lifetime of the solder joint portion on the substrate 2 is predicted (to be described later in detail). Next, on the basis of the result of the lifetime prediction of the solder joint portion, the structure (shape and material) of the sacrificial fracture portion 4 is determined. For example, the sacrificial fracture portion 4 is designed so that the lifetime of the sacrificial fracture portion 4 will be shorter than that of the solder joint portion by a predetermined number of cycles. In the design method shown above, the sacrificial fracture portion 4 is designed on the basis of the lifetime of the solder joint portion. It is needless to say that the structure (shape and material) of the solder joint portion may be designed on the basis of the structure of the sacrificial fracture portion 4.

As described above, since the lifetime of each material needs to be accurately predicted in designing the solder joint portion and the sacrificial fracture portion 4, a method to predict the lifetime of the solder joint portion and the sacrificial fracture portion 4 will be described below.

A method to predict the lifetime against thermal or vibration stress is as follows. First, (1) To calculate data (equivalent strain range $\Delta\varepsilon_{eqv0}$) on the basis of the numerical analysis using the finite element method. Secondly, (2) To calculate a fatigue lifetime formula on the solder joint portion obtained from the durability test. Lastly, the lifetime is predicted using the data and the fatigue lifetime formula respectively obtained from the above procedures (1) and (2).

Here, the equivalent strain range $\Delta\varepsilon_{eqv}$ is a parameter indicating the difference between the maximum value and the minimum value of the equivalent strain $\varepsilon_{eqv}$ applied to an object during one cycle of the thermal or vibration stress. The above-mentioned equivalent strain $\varepsilon_{eqv}$ is a parameter represented by the following formula 1 from von Mises condition using three principal strains generated within an object under a triaxial stress state. Note that, $\varepsilon1$, $\varepsilon2$, and $\varepsilon3$ in the following formula 1 respectively indicate the principal strains in X axis direction, Y axis direction, and Z axis direction in the coordinate system, for example, shown in FIG. 3, etc. Also, $\nu$ indicates the Poisson's ratio. Hereinafter, it is assumed that $\Delta\varepsilon_{eqv0}$ is the value obtained by the calculation of the above procedure (1) and $\Delta\varepsilon_{eqv}$ is the value obtained by the calculation of the above procedure (2).

$$\varepsilon_{eqv} = \frac{1}{1+\nu}\sqrt{\frac{1}{2}\{(\varepsilon_1 - \varepsilon_2)^2 + (\varepsilon_2 - \varepsilon_3)^2 + (\varepsilon_3 - \varepsilon_1)^2\}} \quad \text{[Formula 1]}$$

First, the calculation method of the data (equivalent strain range $\Delta\varepsilon_{eqv0}$) on the basis of the numerical analysis of the above procedure (1) will be described. An analytical model for the mounting component 1, the substrate 2, and solder joint portions connecting the substrate 2 and the mounting component 1 is created. Next, using the created analytical model, simulation is carried out in a case in which stress such as heat or vibration is applied to the substrate 2. With the simulation, the equivalent strain range $\Delta\varepsilon_{eqv0}$ actually applied to the solder joint portions can be estimated.

Figure 6:
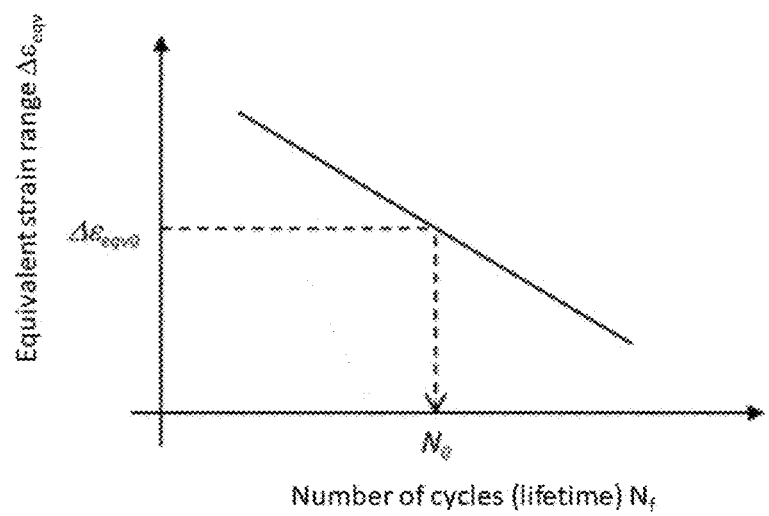
FIG. 6 is a schematic diagram showing a fatigue lifetime formula, which is an approximation formula calculated on the basis of fatigue lifetime data obtained from a durability test on a metallic material including solder.

Next, the calculation method for the fatigue lifetime formula in the above procedure (2) will be described below. FIG. 6 is a schematic diagram showing the fatigue lifetime formula, which is an approximation formula calculated on the basis of the fatigue lifetime data obtained from the durability test on a metal material including a solder. In the figure, the vertical axis represents the equivalent strain range $\Delta\varepsilon_{eqv}$ and the horizontal axis represents the number of cycles (lifetime) $N_f$. The line segment in the figure shows the fatigue lifetime formula. The fatigue lifetime formula is an approximation formula in which the fatigue lifetime data is approximated by the form of the following formula 2. $\alpha$ and $\beta$ in the formula 2 are parameters of the approximation formula, each taking different values depending on the material and the fracture mode of the solder joint portions. Note that the above-mentioned fatigue lifetime data is data including multiple datasets each composed of the equivalent strain ranges $\Delta\varepsilon_{eqv}$ and the number of cycles (lifetime) $N_f$. However in FIG. 6, the datasets are omitted from the illustration, and the illustration includes only the fatigue lifetime formula (approximation formula).

$$\Delta\varepsilon_{eqv} = \alpha \times N_f^{-\beta} \quad \text{[Formula 2]}$$

Lastly, if the equivalent strain range $\Delta\varepsilon_{eqv0}$ is substituted in the left-hand side of the above formula 2 and the resulting equation is solved for the number of cycles (lifetime) $N_f$, then $N_f = N_0$ is derived. Here, $N_0$ is the estimated lifetime of the solder joint portions.

Figure 7:
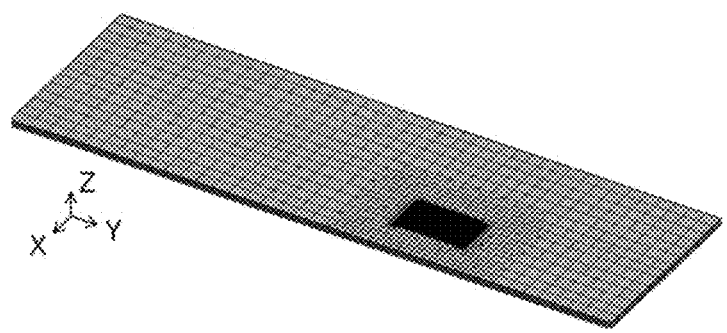
FIG. 7 is an overall view of an analytical model simulating the solder joint portions between a QFP type package and a substrate according to Embodiment 1.
Figure 8:
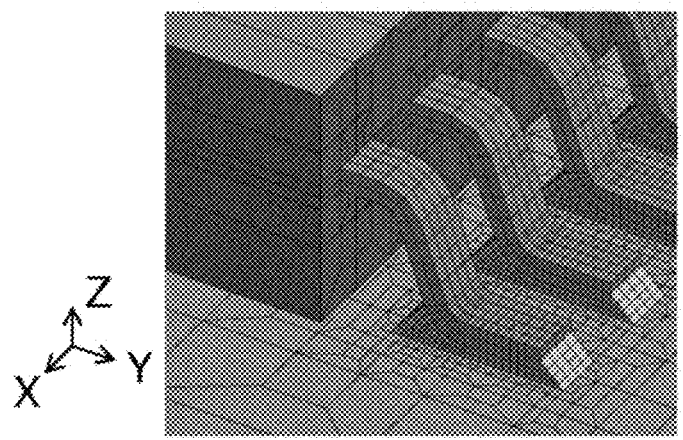
FIG. 8 is an enlarged view of the analytical model simulating the solder joint portions between a QFP type package and a substrate according to Embodiment 1.

Here, the design method of the solder joint portions and the sacrificial fracture portion 4 will be described in detail. Here, it is assumed that the fracture mode is attributed to thermal stress, and thermal stress is applied by heat cycles (temperature range: −65 degrees C. to 95 degrees C.). In addition, it is also assumed that the solder joint portions connect a QFP type package and the substrate 2, and the solder joint portions are formed of a eutectic solder (Pb: 37%, Sn: 63%). FIG. 7 is an overall view of the analytical model simulating the solder joint portions between the QFP type package and the substrate 2. FIG. 8 shows an enlarged view of the solder joint portions of the analytical model shown in FIG. 7.

First, in the above procedure (1), calculation is performed by the numerical analysis simulating the heat cycles with the temperature range from −65 degrees C. to 95 degrees C., and the equivalent strain range $\Delta\varepsilon_{eqv0}$ applied to the solder joint portions is estimated.

Note that, a package such as a BGA type and a QFP type have multiple solder joint portions as illustrated in FIG. 8. In such multiple solder joint portions, if the shapes thereof are different from each other, stress in a different direction for each of the solder joint portions is generated and each of the solder joint portions may have a different fracture mode. In this case, by focusing on a solder joint portion having the shortest lifetime (having the largest equivalent strain range) among the multiple solder joint portions, the lifetime is predicted using the equivalent strain range $\Delta\varepsilon_{eqv0}$ obtained from the above procedure (1) and the fatigue lifetime formula obtained from the above procedure (2).

Among the multiple solder joint portions (illustrated in FIG. 8) of the QFP type package, the solder joint portion of the lead at the corner of the package (the portion positioned at the nearest side in the figure) has an equivalent strain range $\Delta\varepsilon_{eqv0}$ of $8.8 \times 10^{-3}$, which is the largest equivalent strain range $\Delta\varepsilon_{eqv0}$. Thus, the lifetime is predicted for this solder joint portion.

In addition, the fatigue lifetime data for calculation of the fatigue lifetime formula in the above procedure (2) is obtained by performing a heat cycle test for the eutectic solder. From the obtained fatigue lifetime data, the coefficients $\alpha$ and $\beta$ of the above formula 2 are respectively calculated to be 0.38 and 0.44. By substituting these calculated values of the coefficients into formula 2, formula 3 (the fatigue lifetime formula) is derived.

$$\Delta\varepsilon_{eqv} = 0.38 \times N_f^{-0.44} \quad \text{[Formula 3]}$$

From the above, since the equivalent strain range $\Delta\varepsilon_{eqv0}$ described above is $8.8 \times 10^{-3}$, by substituting the value into the left side of the above formula 3, the lifetime of the solder joint portion $N_f$ ($N_0$) can be estimated to be 5207 cycles.

Figure 9:
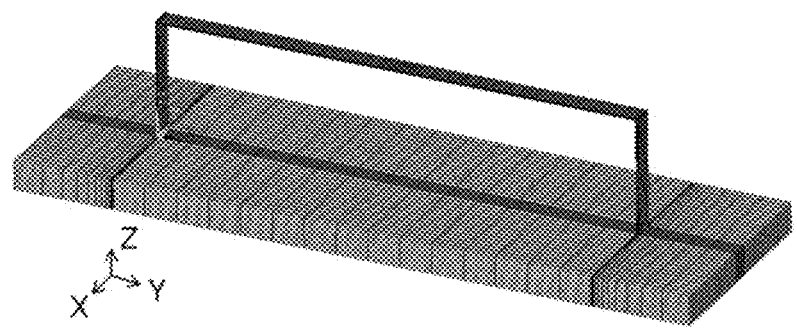
FIG. 9 is an overall view of an analytical model created with the shape of the load amplifying portion shown in FIG. 3 in carrying out a numerical analysis according to Embodiment 1.

As with the solder joint portion, the lifetime of the sacrificial fracture portion 4 can be estimated. First, using the formula 1, the equivalent strain range $\Delta\varepsilon_{eqv0}$ applied to the sacrificial fracture portion 4 is estimated. Here, the shape of the load amplifying portion 60 is assumed to be the shape shown in FIG. 3. FIG. 9 shows an analytical model for a numerical analysis that is carried out on the basis of the shape of the load amplifying portion 60 in FIG. 3.

Assuming that the material of the sacrificial fracture portion 4 is an eutectic solder as with the solder joint portion, the material of the support leg portions 3 is an oxygen-free copper, and the material of the substrate is FR-4, in the same way as the numerical analysis for the solder joint portion, calculation is performed by simulating the heat cycles with a temperature range between −65 degrees C. and 95 degrees C. As a result, the equivalent strain range $\Delta\varepsilon_{eqv0}$ of the sacrificial fracture portion 4 is calculated to be $9.6 \times 10^{-3}$. By substituting the derived value into the above formula 3, the lifetime $N_f$ of the sacrificial fracture portion 4 can be estimated to be 4273 cycles.

With the structure in this example, the lifetime of the sacrificial fracture portion 4 can be designed to be shorter than that of the solder joint portion. This means that, since it is possible to fracture the sacrificial fracture portion 4 earlier than the solder joint portion, the failure prediction device can predict failure of the solder joint portion before it is fractured. Note that, in the present embodiment, although description is made for an example of the load amplifying portion 60 shown in FIG. 3, not limited to the example, the structure (shape and material) of the load amplifying portion 60 may be any structure as long as the lifetime of the sacrificial fracture portion 4 can be shorter than that of the solder joint portions.

As in the example described above, in a case where the sacrificial fracture portion 4 is formed of the same material as that of the solder joint portions and the fracture modes in the sacrificial fracture portion 4 and the solder joint portions are the same, the formula calculated for the solder joint portions may be used as a fatigue lifetime formula. Not to mention, even in the case described above, fatigue lifetime data obtained by a durability test for the sacrificial fracture portion 4 in the same way as the solder joint portions can be used.

In contrast, in a case where the sacrificial fracture portion 4 is formed of a different material from that of the solder joint portions or in a case where the fracture modes in the sacrificial fracture portion 4 and the solder joint portions are different, the fatigue lifetime data each for the sacrificial fracture portion 4 and the solder joint portions is obtained through a durability test and the fatigue lifetime formulas are calculated from the obtained fatigue lifetime data.

Using an example in which thermal stress is applied to the substrate 2, a lifetime design method for the solder joint portions and the sacrificial fracture portion 4 is described above. Also in a case where vibration stress is applied to the substrate 2, the lifetime design can be made in the same way. To shorten the lifetime of the sacrificial fracture portion 4, the following two methods are available: a method to increase strain (stress) applied to the sacrificial fracture portion 4 and a method to decrease strength of the sacrificial fracture portion 4. These method will be described in detail in embodiments to be described later.

Figure 10:
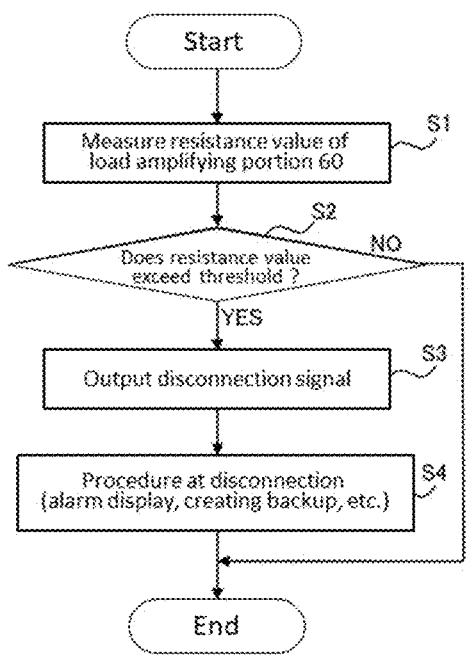
FIG. 10 is a flow chart showing an operation in failure prediction of the circuit board according to Embodiment 1.

Next, referring to FIG. 10, operation according to the present embodiment will be described. FIG. 10 is a flow chart showing the operation in the failure prediction according to Embodiment 1. The measurement section 5, connected to the load amplifying portion 60 as previously described, measures an electric resistance value of the load amplifying portion 60 regularly or irregularly (Step S1).

The failure prediction unit determines that disconnection occurs when the electric resistance value exceeds a predetermined threshold value (Step S2), and outputs a disconnection signal (Step S3).

The timing to measure (monitor) the electric resistance value is, for example, when the power supply is turned on, because the temperature fluctuates much. When the turn-on state of the power supply continues, monitoring may be carried out at fixed time intervals. In a case where disconnection occurrence is determined on the basis of the change in the electric resistance value, the disconnection signal outputted may be displayed as an alarm on a display or the like, so that a user can be informed that the damage level of the joint portions is high and the fracture is imminent. In addition, it is desirable to provide a means to make a data backup simultaneously at the time of the issuance of the disconnection signal. This helps to avoid the risk of losing data due to the failure occurrence (Step S4).

Note that in the above description, the operation to predict failure is shown. Instead, using the following method, the damage level of the solder joint portions may be estimated from the change in the electrical characteristic.

An example of the estimation method for the damage level will be described. The failure prediction unit (not illustrated) obtains the damage level of the solder joint portions in accordance with the electrical characteristic of the load amplifying portion 60 measured by the measurement section 5, and a damage and electrical characteristic database. Here, the damage and electrical characteristic database is a database in which the electrical characteristic of the load amplifying portion 60 and the damage of the solder joint portions are kept in association with each other, the database being created by accumulating results derived from experiments in advance.

Figure 11:
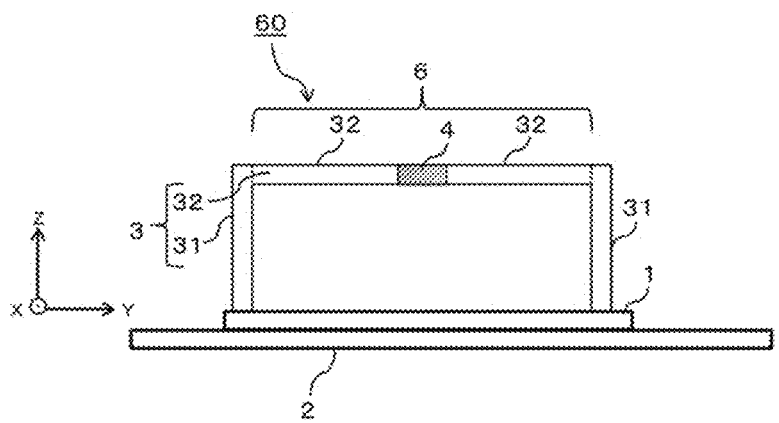
FIG. 11 is a side view showing a variation in which the load amplifying portion of the circuit board according to Embodiment 1 is disposed on a mounting component.

FIG. 11 is a side view showing a variation in which the load amplifying portion 60 according to Embodiment 1 is disposed on a mounting component. In the description before, a structure in which the load amplifying portion 60 is disposed on the substrate 2 is described. However, a structure may be provided in which the load amplifying portion 60 is disposed on a mounting component 1 mounted on the substrate 2. This leads to reduction of the number of parts to be mounted on the substrate 2 and reduction of the man hours for mounting the parts, and reduction of the production cost. In addition, assignment of an area on the substrate for the load amplifying portion 60 is not needed, thereby leading to high density mounting on the substrate 2.

Figure 12:
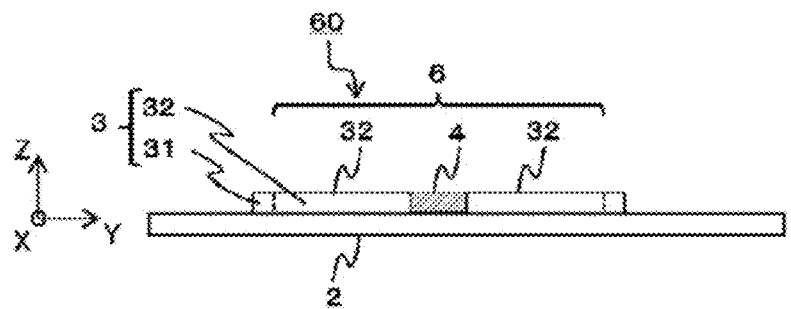
FIG. 12 is a side view showing a variation of the load amplifying portion of the circuit board according to Embodiment 1.

FIG. 12 is a side view showing a variation of the load amplifying portion 60 according to Embodiment 1. As shown in the figure, the sacrificial fracture portion 4 is disposed in contact with the substrate 2 (or the mounting component 1). To be more specific, the thickness (in the Z direction) of the bridge connection portions 32 is structured to be equal to or larger than the length of the legs 31 (in the Z direction).

In a structure shown in FIG. 12 in which the sacrificial fracture portion 4 and the substrate 2 are in contact with each other, deformation of the sacrificial fracture portion 4 in the out-of-plane direction (Z direction) caused by vibration stress may be hindered. In such a case, the lifetime of the sacrificial fracture portion 4 can be designed to be shorter than the lifetime of the solder joint portions by using a method for decreasing strength of the sacrificial fracture portion 4, instead of a method of increasing strain in the sacrificial fracture portion 4.

Note that, in addition to the case in which the sacrificial fracture portion 4 and the substrate 2 (or the mounting component 1) are in close contact with each other without a gap between them, the case described above in which "the substrate 2 and the sacrificial fracture portion 4 are in contact with each other" includes a case in which a gap with a height corresponding to the height (for example, 2 to 3 millimeters or less) of a solder joint portion is provided between the sacrificial fracture portion 4 and the substrate 2 (or the mounting component 1).

According to Embodiment 1, since the sacrificial fracture portion 4 is disposed at a position where large deformation occurs due to vibration stress, using the structure having a high degree of design freedom, failure of the solder joint portions caused by the vibration stress can be predicted.

Embodiment 2

Figure 13:
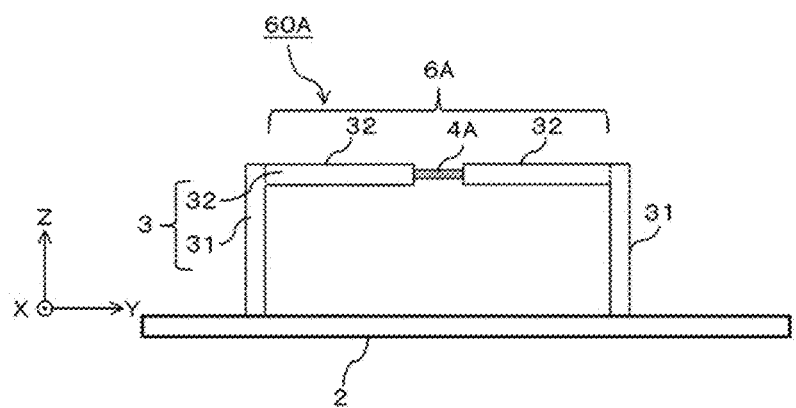
FIG. 13 is a side view showing a load amplifying portion of the circuit board according to Embodiment 2.

FIG. 13 is a schematic diagram showing a shape of a load amplifying portion 60A of a circuit board according to Embodiment 2. In Embodiment 1, the support leg portions 3 has the same thickness in the Z direction as the sacrificial fracture portion 4. In the present embodiment, a sacrificial fracture portion 4A is formed to be smaller in its thickness in the Z direction than the support leg portions 3. Note that, in the present embodiment, only the structures different from those in Embodiment 1 will be described, and those of the same or corresponding structures will not be described again.

In the circuit board according to the present embodiment, the sacrificial fracture portion 4A is structured to have a smaller thickness in the out-of-plane direction (Z direction) than the thickness of the support leg portions 3. With the structure, in a case where either vibration stress or thermal stress, or both of them are applied to the substrate 2, deformation (stress) of the sacrificial fracture portion 4A can be enhanced and the crack extension distance in the sacrificial fracture portion 4A can be made small, so that the structure can be fractured more easily. In addition, by adjusting the dimensions such as thickness, length and sectional area of the member, the sacrificial fracture portion 4A can be designed to have a target lifetime. Further, with respect to the solder joint portions in each of mounting components 1, if information on the difference in the lifetime compared with that of the sacrificial fracture portion 4A is obtained in advance, the remaining life of the solder joint portions can be predicted more accurately.

In the present embodiment, the shapes of the sacrificial fracture portion 4A and the support leg portions 3 are made different. Thus, in addition to the effect described in Embodiment 1, an effect is such that the sacrificial fracture portion 4A can be made to be designed easily to have a target fracture lifetime.

Embodiment 3

Figure 14:
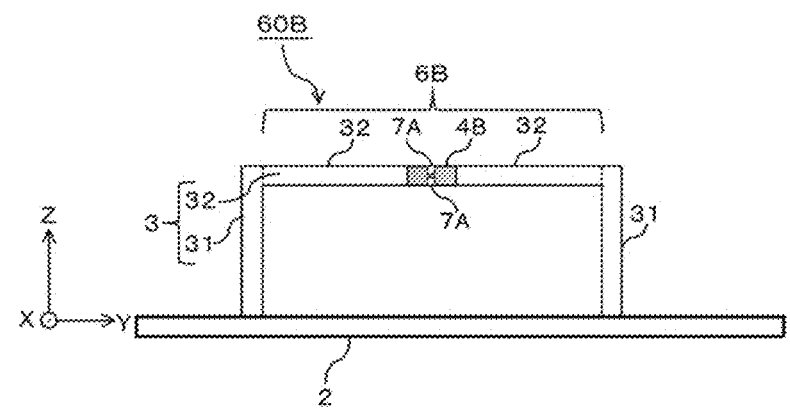
FIG. 14 is a side view showing a load amplifying portion of the circuit board according to Embodiment 3.
Figure 15:
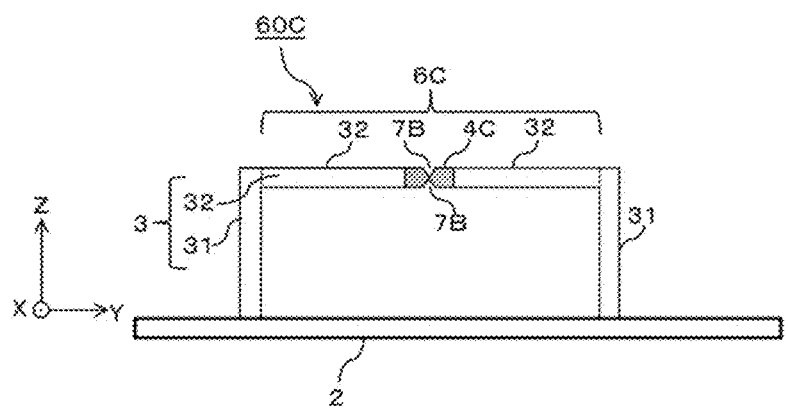
FIG. 15 is a side view showing a variation of the load amplifying portion of the circuit board according to Embodiment 3.

FIG. 14 is a schematic diagram showing an example of the shape of a load amplifying portion 60B of a circuit board according to Embodiment 3. FIG. 15 is a schematic diagram showing an example of the shape of a load amplifying portion 60C, which is a variation of the load amplifying portion 60B shown in FIG. 14. A sacrificial fracture portions 4B and 4C according to Embodiment 3 are different from those in Embodiment 1 in that they each include notches. In the present embodiment, only the structures different from those in Embodiment 1 will be described, and those of the same or corresponding structures will not be described again.

The load amplifying portions 60B and 60C according to the present embodiment respectively include a sacrificial fracture portion 4B having rectangular notches 7A (shown in FIG. 14) and a sacrificial fracture portion 4C having triangular notches 7B (shown in FIG. 15). The shape of the notches in the bridge portions 6B and 6C may be any shape as long as the thickness of the sacrificial fracture portion in the Z direction is made thinner. As shown in FIG. 14 and FIG. 15, although notches are symmetrically provided on the both side faces perpendicular to the out-of-plane direction (Z direction) of the substrate 2, regarding the notches 7A or 7B, a single notch may be provided only to one of the side faces. Furthermore, the location of the notches are not limited to the faces perpendicular to the out-of-plane direction (Z direction). Instead, the notches may be provided to the faces perpendicular to the X direction or Y direction as long as strength of the sacrificial fracture portion can be made lower than strength of the support leg portions 3 of the load amplifying portions 60B and 60 C.

With the structure, in addition to the same effect in Embodiment 2, time and effort for the machining can be saved in comparison with Embodiment 2.

Embodiment 4

The load amplifying portion 60 according to the present embodiment is formed to have a shape such that natural frequency thereof is the same as the frequency of vibration stress applied to the substrate 2. As a method to change the natural frequency of the load amplifying portion 60, there is a method in which the length in the lengthwise direction, the width, and the thickness of the load amplifying portion 60 are changed.

The amplitude of vibration of the load amplifying portion 60 changes in accordance with the frequency of the vibration applied to the substrate 2. In general, when vibration whose frequency is close to the natural frequency of a member is applied thereto, the member starts resonating, so that the stress applied to the member becomes larger. For example, in a case when the load amplifying portion 60 is formed with dimensions shown in FIG. 3, the natural frequency of the load amplifying portion 60 is 490 Hz. Here, as the physical properties of the support leg portions 3 and the sacrificial fracture portion 4, elastic coefficients are 123 and 42 (gigapascal), Poisson's ratios are 0.33 and 0.36, and, densities are 8880 and 7400 (kilograms per cubic meter), respectively. In FIG. 3, the support leg portions 3 (copper) and the sacrificial fracture portion 4 (lead-free solder) are formed of different materials with each other. In a case, however, when the support leg portions 3 and the sacrificial fracture portion 4 are formed of the same material, that is, copper, the natural frequency of the load amplifying portion 60 is 525 Hz. In this manner, by changing the material and the shape, the load amplifying portion 60 can be formed to have any natural frequency. With such a structure, the natural frequency of the load amplifying portion 60 can be matched to the frequency of the vibration applied to the substrate 2, and thus an effect is such that the vibration applied to the substrate 2 can be effectively amplified at the load amplifying portion 60 and the sacrificial fracture portion 4 can be reliably fractured.

In the present embodiment, the vibration stress whose frequency range contains the natural frequency of the load amplifying portion 60 is applied to the substrate 2, the load amplifying portion 60 resonates and amplifies the deformation (stress) that occurs at the sacrificial fracture portion 4. Thus, the sacrificial fracture portion 4 under the vibration stress can be designed to have the target lifetime and, in addition to the effect described in Embodiment 1, the lifetime of the joint portions between the substrate 2 and the mounting components 1 under vibration stress can be accurately predicted.

Embodiment 5

Figure 16:
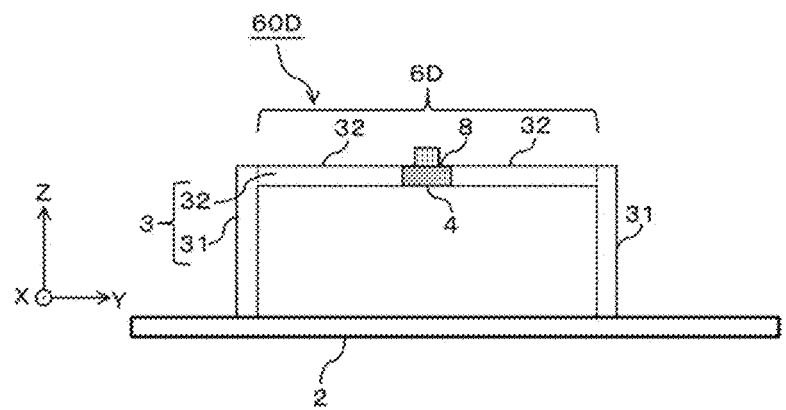
FIG. 16 is a side view showing a load amplifying portion of the circuit board according to Embodiment 5.

FIG. 16 is a schematic diagram showing a shape of a load amplifying portion 60D of a circuit board according to Embodiment 5. The load amplifying portion 60D according to Embodiment 5 is different from that in Embodiment 1 in that a mounting weight 8 is placed on the upper face of the sacrificial fracture portion. In the present embodiment, only the structures different from those in Embodiment 1 will be described, and those of the same or corresponding structures will not be described again.

In the circuit board according to the present embodiment, the mass of the sacrificial fracture portion 4 can be increased, so that the deformation (stress) in the out-of-plane direction (Z direction) that occurs at the sacrificial fracture portion 4 can be increased when the substrate 2 is under vibration stress. As a result, the sacrificial fracture portion 4 can be fractured earlier owing to vibration stress, and thus in a stage before the solder joint portions between the mounting component 1 and the substrate 2 are fractured, the sacrificial fracture portion 4 can be reliably fractured. Thus, this can further reduce the possibility that the solder joint portions are fractured before the sacrificial fracture portion 4 is fractured, and the fracture of the solder joint portions cannot be predicted.

In addition, by providing the mounting weight 8, the natural frequency of the bridge portion 6D or the load amplifying portion 60D can be lowered. By adjusting the mass of the mounting weight 8, the target natural frequency can be readily adjusted. With this way, when vibration stress with a wide frequency range containing the natural frequency of the load amplifying portion 60D is applied to the substrate 2 from outside, the deformation (stress) of the sacrificial fracture portion 4 can be increased as in Embodiment 4. Note that the mounting weight 8 to be adhered on the sacrificial fracture portion 4 is preferably made of a non-conductive material. In the case of the conductive material, it may be a current path even after the fracture of the sacrificial fracture portion 4, detection of the change in the electrical characteristic (e.g., detection of the fracture in the sacrificial fracture portion 4 may possibly be difficult). Therefore, when a conductive material is used, the conductive material is covered with an insulating material such as an insulating resin, so that the mounting weight 8 does not function as a current path and the fracture of the sacrificial fracture portion 4 can be reliably detected.

In the present embodiment, the structure is such that the mounting weight 8 is disposed on the upper face of the sacrificial fracture portion 4. Thus, in addition to the effect described in Embodiment 1, the possibility that the solder joint portions are fractured before the fracture of the sacrificial fracture portion 4 can be further reduced.

Embodiment 6

Figure 17:
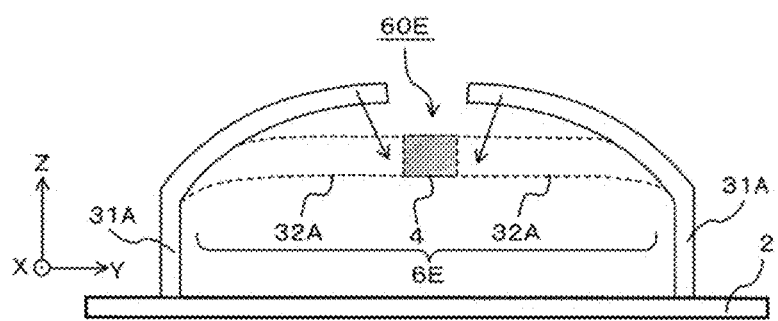
FIG. 17 is a side view showing a load amplifying portion of the circuit board according to Embodiment 6.

FIG. 17 is a schematic diagram showing a shape of a load amplifying portion 60E of a circuit board according to Embodiment 6. As shown in the figure, when the load amplifying portion 60E is formed, bridge connection portions 32A are moved from the position indicated by the solid line to the position indicated by the broken line, and then fixed to the both ends of the sacrificial fracture portion 4.

The load amplifying portion 60E according to Embodiment 6 is different from that in Embodiment 1 in that a pair of support leg portions 3A showing their elastic forces is fixed to the sacrificial fracture portion 4. In other words, the sacrificial fracture portion 4 is fixed in a state of being sandwiched by a pair of the bridge connection portions 32A showing their elastic forces. The support leg portions 3A according to the present embodiment are formed of an elastic material being resilient like a spring. The support leg portions 3A formed of an elastic material are joined to the sacrificial fracture portion with their lengths extended or contracted from the natural lengths thereof. Thus, the support leg portions 3A are fixed to the sacrificial fracture portion 4 with stress in the in-plane direction (Y direction) applied from the sacrificial fracture portion 4. In the present embodiment, only the structures different from those in Embodiment 1 will be described, and those of the same or corresponding structures will not be described again.

Regarding the structure of the support leg portions 3A according to the present embodiment, the bridge connection portions 32A of a bridge portion 6E are bent in shape in the out-of-plane direction (Z direction) with respect to the substrate 2, instead of being held horizontally as in Embodiment 1, and thereby the support leg portions 3A, while elastic force is applied thereto, are fixed to respective ends of the sacrificial fracture portion 4. With the structure, when a crack is generated in the sacrificial fracture portion 4 under either vibration stress or thermal stress, or both of them in the substrate 2, the crack in the sacrificial fracture portion 4 extends owing to the elastic force applied to the support leg portions 3A to fracture the sacrificial fracture portion 4. Thus, since the time from creation of a crack to the fracture can be shortened, the change in the electrical characteristic of the sacrificial fracture portion 4 can be reliably detected and the lifetime of the joint portions between the substrate 2 and the mounting component 1 can be predicted more accurately.

In the present embodiment, the structure includes the sacrificial fracture portion 4 that is joined to the support leg portions 3A with elastic force applied thereto. Thus, since the time from creation of a crack to the fracture of the sacrificial fracture portion 4 can be shortened, in addition to the effect described in Embodiment 1, an effect is such that the change in the electrical characteristic of the load amplifying portion 60 caused by the fracture of the sacrificial fracture portion 4 can be reliably detected.

Embodiment 7

Figure 18:
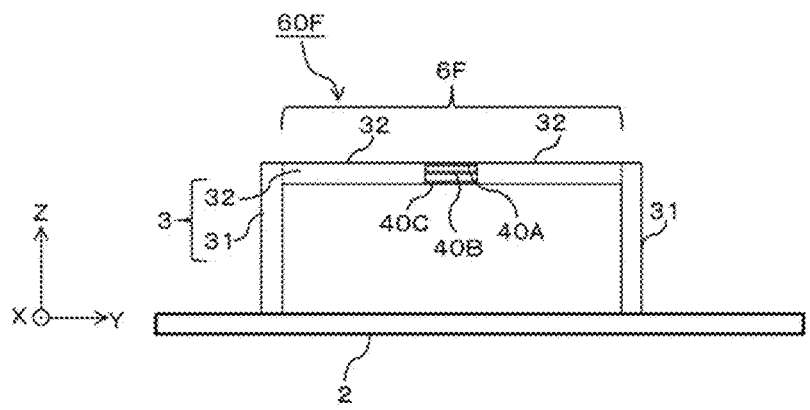
FIG. 18 is a side view showing a circuit board according to Embodiment 7.

FIG. 18 is a schematic diagram showing a shape of a load amplifying portion 60F of a circuit board according to Embodiment 7. The load amplifying portion 60F according to embodiment 7 is different from that in embodiment 1 in that multiple sacrificial fracture portions 40A to 40C are provided in the out-of-plane direction (Z direction). In the present embodiment, only the structures different from those in Embodiment 1 will be described, and those of the same or corresponding structures will not be described again.

In the bridge portion 6F, the multiple sacrificial fracture portions 40A to 40C are disposed so as to form a layered structure in the out-of-plane direction (Z direction) of the substrate 2. In other words, the multiple sacrificial fracture portions are disposed with a given distance apart from each other in the out-of-plane direction (Z direction). In the figure, gaps are formed between the sacrificial fracture portions 40A and 40B, and between the sacrificial fracture portions 40B and 40C. Note that, the same effect is obtained with the multiple sacrificial fracture portions 40A to 40C with no gap provided, which are different from the load amplifying portion 60F shown in FIG. 18.

A stress factor determination method will be described. The change in the electrical characteristic at each of the multiple sacrificial fracture portions are measured by the measurement section 5. On the basis of the measurement results obtained by the measurement section 5 on each of the multiple sacrificial fracture portions, fracture states of the sacrificial fracture portions, that is, the disposed position in the Z direction, etc. of each of the sacrificial fracture portions that is fractured, can be known. Further, depending on the fracture state of the sacrificial fracture portions, it is possible to determine which one is the major factor of the failure among vibration stress and thermal stress.

A specific example of the stress factor determination method mentioned above will be described below. As described in Embodiment 1, when vibration stress is applied to the substrate 2, because the stress at the surface-sides of the sacrificial fracture portions with respect to the out-of-plane direction (Z direction) of the substrate 2 is larger, the surface-sides of the sacrificial fracture portions 40A and 40C are fractured first. In contrast, when thermal stress is applied, the sacrificial fracture portions deform in the in-plane direction (Y direction) of the substrate 2. In that case, the same level of stress is applied to each of the sacrificial fracture portions 40A, 40B, and 40C, so that the sacrificial fracture portions 40A, 40B, and 40C are fractured simultaneously.

In the above-mentioned example, the sacrificial fracture portions 40A, 40B, and 40C are respectively disposed on the front surface-side, at the center, and on the bottom surface-side of the load amplifying portion 60F. It is desirable that the sacrificial fracture portions be provided at the center and at least at one of the bottom surface-side or the front surface-side for the reduction of the number of the sacrificial fracture portions. However, it is needless to say that the sacrificial fracture portions may be disposed freely if the number of the sacrificial fracture portions that are usable can be increased.

As shown in FIG. 18, the three sacrificial fracture portions 40A to 40C are provided in the structure. However, even if the number of the sacrificial fracture portions is two, the factor of the failure can be determined by adjusting the disposed position. More specifically, one layer of the sacrificial fracture portions needs to be disposed at the center in the height direction (Z direction) of the bridge connection portions 32 and the other layer of the sacrificial fracture portions needs to be disposed on the front surface-side or the bottom surface-side. In the above-mentioned description, although the stress factor is determined in accordance with the disposed position of the sacrificial fracture portion that is fractured, the stress factor may be determined in accordance with the number of the sacrificial fracture portions that are fractured. In this case, it is not necessary to measure the change in the electrical characteristic of each of the multiple sacrificial fracture portions for determining the disposed position of the sacrificial fracture portion that is fractured. Thus, an overall electrical characteristic of the multiple sacrificial fracture portions may be measured. This contributes to simplify the circuit structure in which the measurement section 5 and the multiple sacrificial fracture portions are connected.

In the present embodiment, the load amplifying portion is structured to include the multiple sacrificial fracture portions arranged in layer in the out-of-plane direction (Z direction). Thus, in addition to the effect described in Embodiment 1, an effect is such that the stress factor can be determined from the position of the sacrificial fracture portion that is fractured.

Embodiment 8

Figure 19:
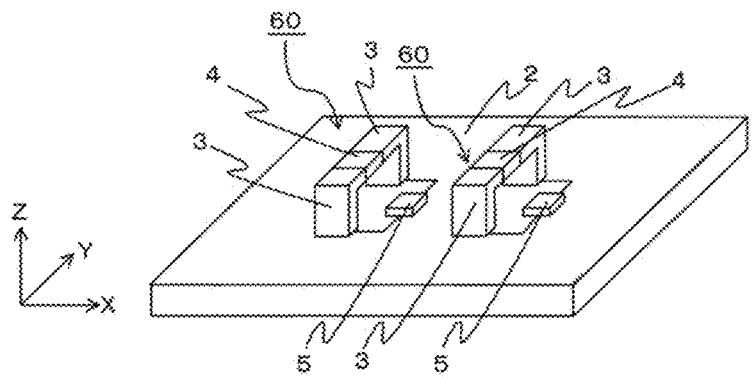
FIG. 19 is a perspective view showing a circuit board according to Embodiment 8.

FIG. 19 is a schematic diagram showing a structure of load amplifying portions 60 and the measurement sections 5 in a circuit board according to Embodiment 8. The circuit board according to Embodiment 8 is different from that in Embodiment 1 in that the multiple load amplifying portions 60 are provided. In the present embodiment, only the structures different from those in Embodiment 1 will be described, and those of the same or corresponding structures will not be described again.

Generally, it is known that, when stress is applied to parts, the lifetime thereof until they are fractured varies owing to manufacturing variation of the parts. Since the circuit board according to the present embodiment is structured to include the multiple load amplifying portions 60 and the multiple measurement sections 5, variations in the lifetime of the sacrificial fracture portions 4 can be taken into account, so that the failure prediction accuracy on the joint portions between the substrate 2 and the mounting component 1 can be enhanced in comparison with Embodiment 1. In FIG. 19, a structure is shown in which two pairs are provided for the load amplifying portion 60 and the measurement section 5. However, the number of the pairs is not limited to two, and the more the number of the load amplifying portion 60 and the measurement section 5 are provided, the more the failure prediction accuracy is enhanced. Further, in the structure, the measurement sections are provided for the respective load amplifying portions 60. Instead, a structure in which a single measurement section measures the electrical characteristic of each of the multiple load amplifying portions 60 may be possible.

A variation of Embodiment 8 will be described next. FIG. 19 shows a structure in which the multiple load amplifying portions 60 having the same fracture lifetime are provided. Instead, a structure in which the remaining life of the solder joint portions are predicted by using multiple load amplifying portions each having a different fracture lifetime may also be possible. For example, in a case where three different types of the load amplifying portions each having a different fracture lifetime are provided, and they are named as a first load amplifying portion, a second load amplifying portion, and a third load amplifying portion in the descending order of fracture lifetime, the remaining life for the solder joint portions can be predicted in accordance with whether or not each of the load amplifying portions is fractured. To be more specific, when the third load amplifying portion has been fractured and the first and the second load amplifying portions have not been fractured yet, it can be determined that the lifetime is longer than that of the third load amplifying portion, but shorter than that of the second load amplifying portion. Thus, the time until the fracture occurs in the solder joint portions, that is, the remaining life, can be predicted more accurately compared with the case in which a single load amplifying portion is provided.

Furthermore, regarding the arrangement method of the multiple load amplifying portions 60, in FIG. 19, an example is shown in which the multiple load amplifying portions 60 are disposed in parallel with each other in their lengthwise directions. Instead, a structure in which the multiple load amplifying portions 60 are disposed in such a manner that their lengthwise directions are perpendicular or intersect with each other may be possible. Thus, an anisotropy in the stress that occurs depending on the direction of the vibration applied to the substrate 2 or the temperature gradient in the substrate 2 can be properly dealt with. For example, two load amplifying portions 60 are disposed so that their lengthwise directions can be perpendicular or intersect with each other. To be more specific, one of the sacrificial fracture portions is disposed so that its lengthwise direction can direct to the X direction, and the other sacrificial fracture portion is disposed so that its lengthwise direction can direct to the Y direction. Thus, one of the load amplifying portions 60 can deal with the vibration in the lateral direction and the other load amplifying portion 60 can deal with the vibration in the longitudinal direction. Therefore, even in a case where the vibration is applied either in the X direction or in the Y direction, at least one of the sacrificial fracture portions 4 of the load amplifying portions 60 is to be fractured, and thus the failure can be predicted by using them. Note that, the example shown in FIG. 19 includes the two load amplifying portions 60. Not to mention that the number of the load amplifying portions 60 may be more than two.

The circuit board according to the present embodiment has a structure in which the multiple load amplifying portions 60 are provided. In addition to the effect achieved in Embodiment 1, by adjusting the number of the load amplifying portions 60 or the arrangement method, etc., an effect is such that the accuracy in the failure prediction can be improved.

Embodiment 9

Figure 20:
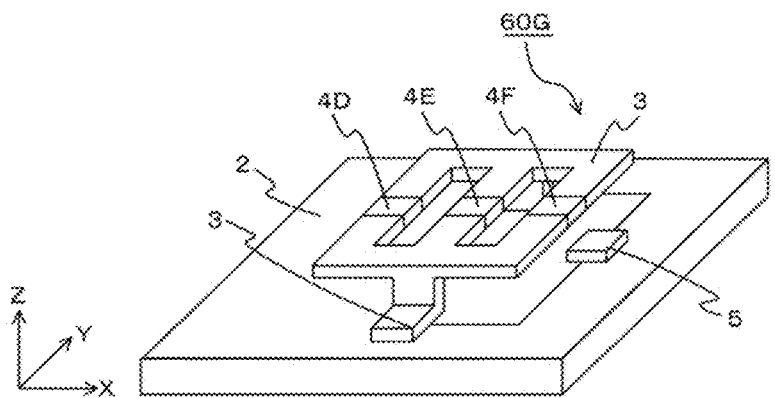
FIG. 20 is a perspective view showing a circuit board according to Embodiment 9.

FIG. 20 is a schematic diagram showing a shape of a load amplifying portion 60G of a circuit board according to Embodiment 9. The circuit board according to Embodiment 9 is different from that in Embodiment 1 in that the load amplifying portion 60G including multiple sacrificial fracture portions 4D to 4F arrayed in the X direction or in the Y direction is provided. In the present embodiment, only the structures different from those in Embodiment 1 will be described, and those of the same or corresponding structures will not be described again.

The circuit board according to the present embodiment has a structure in which the load amplifying portion 60G including the multiple sacrificial fracture portions 4D to 4F formed in a comb shape is provided. In other words, the load amplifying portion 60G includes the multiple sacrificial fracture portions 4D to 4F arranged in the in-plane direction of the substrate 2. Thus, since the area where the load amplifying portion 60G is joined to the substrate 2 can be reduced, in addition to the effect described in Embodiment 1, an effect is such that high density mounting can be made more possible.

Embodiment 10

Figure 21:
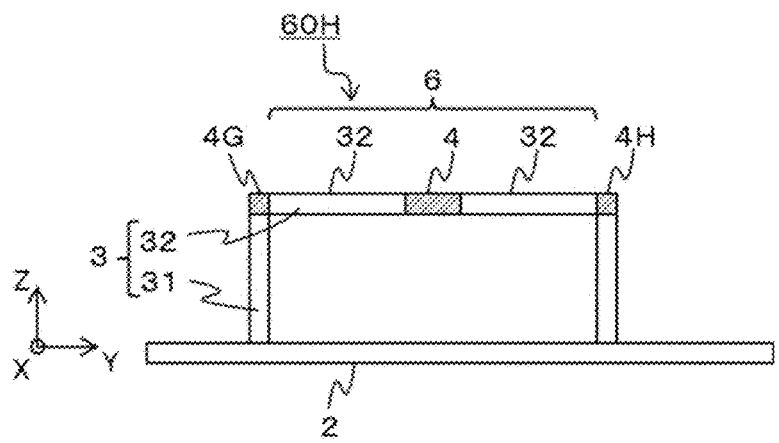
FIG. 21 is a side view showing a load amplifying portion of the circuit board according to Embodiment 10.

FIG. 21 is a side view of a load amplifying portion 60H according to Embodiment 10. The load amplifying portion 60H according to Embodiment 10 is different from that in Embodiment 1 in that the structure includes sacrificial fracture portions 4G and 4H (second sacrificial fracture portions). The sacrificial fracture portion 4G and 4H are provided at connecting portions where the legs 31 and the bridge connection portions 32 are linked. In the figure, the connecting portions between the legs 31 and the bridge connection portions 32 are illustrated in such a way that each of the connecting portions is entirely formed with the sacrificial fracture portion 4G or 4H. Instead, only a part of each connecting portion (not entirely) may be formed with the sacrificial fracture portion 4G or 4H. In the present embodiment, only the structures different from those in Embodiment 1 will be described, and those of the same or corresponding structures will not be described again.

Figure 22:
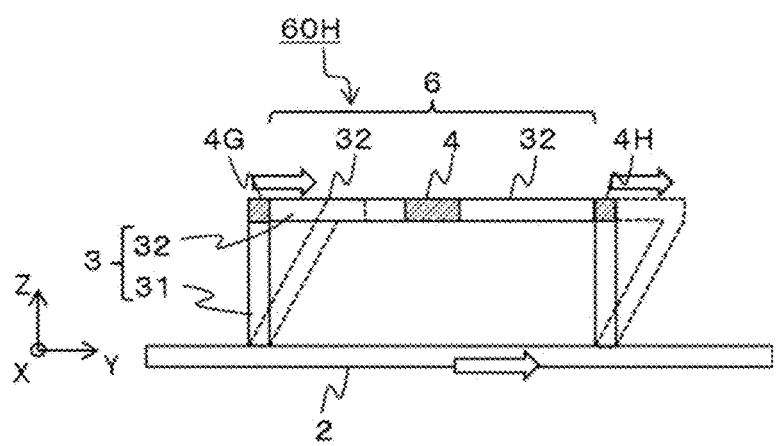
FIG. 22 is a schematic diagram showing deformation of the load amplifying portion of the circuit board according to Embodiment 10 under vibration stress.

FIG. 22 is a schematic diagram showing deformation of the load amplifying portion 60H when the substrate 2 is under vibration stress in the in-plane direction (Y direction). When the substrate 2 is under vibration stress in the in-plane direction (Y direction), the load amplifying portion 60H deforms in the direction indicated by arrows as shown in FIG. 22, that is, in the in-plane direction, with their legs 31 being deformed and bent. Note that, the lifetime of the sacrificial fracture portions 4G and 4H need to be designed so as to be shorter, as with the sacrificial fracture portion 4, than that of the solder joint portions.

Since the sacrificial fracture portions 4G and 4H that are formed in the portions between the legs 31 and the bridge connection portions 32, the portions are repeatedly under tensile stress and compressive stress. Thus, a crack in the sacrificial fracture portion 4G or 4H extends, and fracture thereof eventually occurs. The substrate 2 is under vibration stress in two directions, that is, (A) the out-of-plane direction (Z direction) and (B) the in-plane direction (Y direction or X direction). In the embodiments described before, the structures are suitable for the lifetime prediction of the solder joint portions under vibration stress in the case A. In contrast, the failure prediction device provided with the load amplifying portion 60H according to the present embodiment can predict the lifetime (of the solder joint portions) regarding vibration stress in the case B in addition to A.

Note that the present disclosure is not limited to the above embodiments as they are, and structural components can be modified and embodied in the implementation stage without departing from the scope thereof. In addition, it is possible to create a variety of disclosures by properly combining the multiple structural components disclosed in the above embodiments. Some of the structural components may be deleted from all of the structural components shown in the embodiments. Further, structural components over different embodiments may be properly combined.

The above-described present disclosure can be applied to apparatuses including a printed board. Examples are information communication equipment such as a server and a storage, industrial equipment such as an inverter and a programmable logic controller, inspection apparatuses such as an electron microscope and an atomic force microscope, medical equipment such as proton beam therapy equipment and a nuclear magnetic resonance apparatus, transportation equipment such as an elevator and an escalator, and control boards for a vehicle and a railway car. The application is not limited to these, but to any electronic devices including a printed board.

The invention claimed is:

1. A failure prediction device provided on a substrate having a mounting component that is fixed through a solder joint, comprising:
    a load amplifying portion including a pair of support leg portions each having a first end fixed to the substrate or the mounting component, and a second end, and
    a first sacrificial fracture portion supported by the respective second ends of the pair of support leg portions,
    wherein the load amplifying portion transmits, to the first sacrificial fracture portion via the pair of support leg portions, vibration applied to the substrate.

2. The failure prediction device according to claim 1, further comprising a measurement section to measure an electrical characteristic of the load amplifying portion, wherein failure caused by a crack or fracture of the solder joint is predicted based on a measurement result of the measurement section.

3. The failure prediction device according to claim 1, wherein the first sacrificial fracture portion is disposed apart from the substrate or the mounting component in an out-of-plane direction of the substrate.

4. The failure prediction device according to claim 1, wherein the first sacrificial fracture portion is made of a material different from that of the pair of support leg portions and has lower fracture strength than the pair of support leg portions.

5. The failure prediction device according to claim 1, wherein a sectional area of the first sacrificial fracture portion is formed smaller than a sectional area of the pair of support leg portions.

6. The failure prediction device according to claim 1, wherein the first sacrificial fracture portion is provided with a notch.

7. The failure prediction device according to claim 1, wherein natural frequency of the load amplifying portion is matched to a frequency of vibration stress applied to the substrate.

8. The failure prediction device according to claim 1, wherein a mounting weight is placed on the first sacrificial fracture portion.

9. The failure prediction device according to claim 1, wherein each of the pair of support leg portions has a leg having one end to be fixed to the substrate or the mounting component, and a bridge connection portion connecting the leg and the first sacrificial fracture portion, and a bridge portion is structured in which the bridge connection portion is provided to both ends of the first sacrificial fracture portion.

10. The failure prediction device according to claim 9, wherein the bridge connection portions are formed of an elastic material, and the first sacrificial fracture portion is elastically sandwiched by the bridge connection portions.

11. The failure prediction device according to claim 9, wherein the load amplifying portion further comprises a second sacrificial fracture portion disposed at a connecting portion between the leg and the bridge connection portion of each of the pair of support leg portions.

12. The failure prediction device according to claim 9, wherein the load amplifying portion comprises the bridge portion including multiple bridge portions arranged in a plane parallel to the substrate.

13. The failure prediction device according to claim 1, wherein the load amplifying portion comprises the first sacrificial fracture portion including multiple sacrificial fracture portions arranged in an out-of-plane direction of the substrate.

14. The failure prediction device according to claim 13, wherein a major factor of failure is determined among vibration stress and thermal stress based on arrangement positions in the out-of-plane direction of the first sacrificial fracture portions that are fractured among the multiple first sacrificial fracture portions, and on a number of the first sacrificial fracture portions that are fractured.

15. A circuit board comprising the failure prediction device according to claim 1 and the substrate on which the failure prediction device is disposed.

16. The failure prediction device according to claim 1, further comprising a measurement section to measure an electrical characteristic of the load amplifying portion, wherein, based on a measurement result of the measurement section, failure caused by a crack or fracture of the solder joint is predicted, and
    the first sacrificial fracture portion is disposed apart from the substrate or the mounting component in an out-of-plane direction of the substrate.

17. The failure prediction device according to claim 2, wherein the first sacrificial fracture portion is made of a material different from that of the pair of support leg portions and has a lower fracture strength than the pair of support leg portions.

18. The failure prediction device according to claim 3, wherein the first sacrificial fracture portion is made of a material different from that of the pair of support leg portions and has a lower fracture strength than the pair of support leg portions.

19. The failure prediction device according to claim 16, wherein the first sacrificial fracture portion is made of a material different from that of the pair of support leg portions and has a lower fracture strength than the pair of support leg portions.

* * * * *